(12) United States Patent
Weis et al.

(10) Patent No.: US 6,348,858 B2
(45) Date of Patent: *Feb. 19, 2002

(54) METHOD AND DEVICE FOR SURVEILLANCE OF THE REARWARD OBSERVATION AREA OF MOTOR VEHICLES

(75) Inventors: Tim Weis, Bensheim; Rudolf Mai, Wolfsburg, both of (DE)

(73) Assignee: Volkswagen AG, Wolfburg/Fallersleben (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/479,050

(22) Filed: Jan. 7, 2000

(30) Foreign Application Priority Data

Jan. 8, 1999 (DE) .......................................... 199 00 498

(51) Int. Cl.[7] ................................................. B60Q 1/00
(52) U.S. Cl. ........................ 340/436; 340/435; 340/438
(58) Field of Search .................................. 340/436, 435

(56) References Cited

U.S. PATENT DOCUMENTS

| | | | | | |
|---|---|---|---|---|---|
| 5,235,316 A | * | 8/1993 | Qualizza | ..................... | 340/436 |
| 5,424,952 A | * | 6/1995 | Asayama | ..................... | 364/443 |
| 5,583,495 A | * | 12/1996 | Ben Lulu | ..................... | 340/904 |
| 5,680,123 A | * | 10/1997 | Lee | ..................... | 340/937 |
| 5,959,555 A | * | 9/1999 | Furuta | ..................... | 340/937 |

FOREIGN PATENT DOCUMENTS

| | | | | |
|---|---|---|---|---|
| DE | 39 42 249 A1 | 12/1989 | ............. | B60R/1/00 |
| DE | 39 42 249 | 7/1990 | | |
| DE | 296 09 121 U1 | 5/1996 | ............. | B60R/1/06 |
| DE | 198 16 054 A1 | 4/1998 | ............. | B60R/1/10 |
| DE | 198 16 054 | 10/1998 | | |
| EP | 0 751 041 A2 | 6/1996 | ............. | B60R/1/00 |
| EP | 0 825 064 A1 | 8/1997 | ............. | B60R/1/00 |
| WO | WO 96/38319 | 5/1996 | | |

* cited by examiner

Primary Examiner—Jeffery Hofsass
Assistant Examiner—Son Tang
(74) Attorney, Agent, or Firm—Kenyon & Kenyon

(57) ABSTRACT

The present invention relates to a method and a device for surveillance of the rearward observation area, specific to the outside mirror(s) of motor vehicles, in which the aforesaid observation area is divided into at least two observation zones (10, 20) that are detected using at least one image pick-up sensor element and the detected image is displayed on a display device (40) thus providing an improved rearward view with fewer gaps (blind spots), wherein the observation zones (10, 20) cover different angular ranges.

14 Claims, 2 Drawing Sheets

METHOD AND DEVICE FOR SURVEILLANCE OF THE REARWARD OBSERVATION AREA OF MOTOR VEHICLES

FIELD OF THE INVENTION

The present invention relates to a method and a device, for surveillance of the rearward observation area of a motor vehicle in which said observation area is detected by at least one electronic image pick-up sensor element and is displayed on at least one display device.

BACKGROUND OF THE INVENTION

Inside mirrors and outside mirrors maybe used to observe a portion of the rearward observation area of motor vehicles. Due to the entire interior construction of a motor vehicle body itself, together with interior trim, the inside rearview mirror only allows a limited or obstructed rearward view.

Therefore, an arrangement of so-called outside mirrors is also provided in motor vehicles, the outside mirror typically being mounted on both the passenger side and the driver side. The outside mirror(s) can be adjusted so that a vehicle driver has a quasi-extended rearward view. The rearward view is concentrated essentially on an area representing a relatively small angular range, with one side of this angle corresponding to the motor vehicle body. However, this rearward-facing area should cover the area running along a portion of the side of the vehicle and be essentially far-reaching and directed to the rear in as straight a line as possible. In this manner, an extended viewing area can be formed, supplementing the inside mirror, so that it covers the rearwardly-directed environment around the vehicle providing a view of adjacent traffic lanes and possibly approaching vehicles as well. Accordingly, this extended viewing area defines a relatively acute-angled area in order to have a rearward view which is as far-reaching as possible. Even with properly adjusted outside mirrors there is a blind spot in the extended viewing area that cannot be observed via the rearview mirror(s).

A vehicle driver, however, must be concerned with viewing the area of the so-called 'blind spot', which is not covered by the typical outside rearview mirror arrangement. The blind spot area relates to the lateral space directly adjacent to the vehicle. Dangerous driving situations can occur because the "blind-spot area" is poorly observed.

In conventional multiply-split outside mirrors a second mirror or a second mirror segment is used for surveillance, i.e., observation, of the "blind-spot area". Such mirrors are normally small and, therefore, only enable a view of a relatively small portion of the blind spot. To slightly improve this, the aforesaid second mirror or second mirror segment can be somewhat rounded to provide a wider viewing angle. However, rounding the mirror results in a distortion which has the disadvantage that it is no longer possible to correctly show proportional distances and clearances.

An outside mirror based on the above described principles is known, for example, from German Patent No. 296 09 121 U1. In this connection, the second smaller mirror is separately adjustable, but it still only covers a relatively limited solid-angle viewing area.

There are also a number of electronic solutions in which the key idea is the full electronic implementation of the rearview mirror function. Thus, an image-sensor arrangement for examining the area of motor vehicles not directly viewable is known from European Patent No. 0 825 064 A1. In that case, the image sensors are installed on the front side of the vehicle and are intended to provide a view around the entire perimeter of the vehicle body. This may be a useful aid in parking but such an arrangement is not suitable for observing the subspace normally covered by a rearview mirror, at least in the form described in that patent.

Another electronic implementation of the rearview mirror function is described in WO 96/38319. However, in this case, the simple and normal surveillance of the rearward space is also the principal object.

Similarly, European Patent No. 0 751 041 A2, is directed to simple observation of the vehicle perimeter. An electronically-implemented, direct rearview mirror function is not disclosed.

OBJECTS AND SUMMARY OF THE INVENTION

It is an object of the present invention to provide safer vehicle operation by means of improved outside rearview mirror(s) observation with an electronically-implemented method and device that provide direct rearview mirror function.

Another object of this invention is to provide a method and a device that improve visibility of the rearward observation area, especially that based on the outside mirror, of motor vehicles that can be observed reliably, while avoiding "blind spot areas".

The present invention provides an improved method for surveillance of an outside rearview mirror observation area of a motor vehicle, comprising detecting the observation area with at least one image pick-up sensor element; displaying an image of observation area detected by the image pick-up sensor element so that the image is subdivided in to first and second observation zones having unequal angular ranges.

The present invention further provides a device for surveillance of an outside mirror rearward observation area of a motor vehicle, comprising at least one image pick-up sensor element for detecting the observation area and at least one display device for displaying an image of the detected observation area, wherein the displayed observation area image may be subdivided into first and second observation zones having different angular ranges.

The present invention improves the rearview mirror function, providing a rearwardly-directed observation area of a motor vehicle covering all angular ranges, i.e., including the critical angular range known as the blind spot. In accordance with the present invention the "blind spot area" is covered in an angular range, i.e., the second observation zone (20) larger than the angular range directed rearward in a straight line, i.e., the first observation zone (10), the two aforesaid, detected observation zones then being imaged or displayed side-by-side in a width ratio inversely proportional to the respective angular ranges of each observation area. This means in practice that a first acutely-angled angular range (10) directed far to the rear, whose one side is directly contiguous to the motor vehicle, is detected with the aid of the image pick-up sensor elements. In addition, the area of the blind spot is detected as well. In so doing, the blind spot area is now no longer detected over an acute angle, but rather over an angular range considerably larger than the first observation zone (10). Therefore, the detection of the second observation zone (20), the "blind spot area", is comprehensive and very wide-ranging. This second observation zone (20) can be extended in such a way that it extends to the point where the optically detectable area of the motor vehicle driver's field of vision begins. Thus, the motor vehicle driver can now view, with electronic support and, indeed, without gaps, the entire area next to the vehicle all the way to the rear, adjacent to the first observation zone. In turn, the image of the two observation zones is generated on the display device with a width ratio inversely proportional to their angular range. This means that the relatively small-angled, therefore acute-angled, first observation zone, which is essentially directed to the rear, is imaged on a relatively wide display segment, while the much wider-angled second observation area of the so-called blind spot is imaged on a correspondingly smaller display segment next to the other display segment. In this manner, the entire detected, wide-angled "blind spot" is still displayed, and indeed completely, in spite of the blind spot display area being small. In this way, the display segment for observing the blind spot, as previously mentioned, can be designed smaller, this, however, is not at the expense of the remaining detected angular range. This is only possible, because image pick-up sensor elements are now used in appropriate fashion.

Consequently, a further advantageous refinement of the present invention provides for at least two image pick-up sensor elements in place of each conventional outside mirror. In addition, another advantageous refinement of the present invention fixes the detected angular range of the observation zones in such a way that both zones border on each other. By this means, a view without gaps of the rearwardly directed observation area of a motor vehicle is ensured.

The described procedure may be implemented in a device that, as previously mentioned, includes at least two image pick-up sensor elements provided in place of each conventional outside mirror. However, a further possibility is to use a single image pick-up sensor element having two image detection zones, separated from each other and belonging to the image detection element of the sensor element, which are projected by an appropriately split optical device. Then, a corresponding evaluator can support this projection, separately process the corresponding picture segments, and separately display them in the above-described manner on a split or two-segmented display device.

In a further advantageous refinement of the present invention, the image pick-up sensor element is connected in this context to an evaluator or electronic evaluation device, which evaluates the image.

The present invention is described more precisely below using an exemplary embodiment.

DETAILED DESCRIPTION OF THE INVENTION

Figure 1:
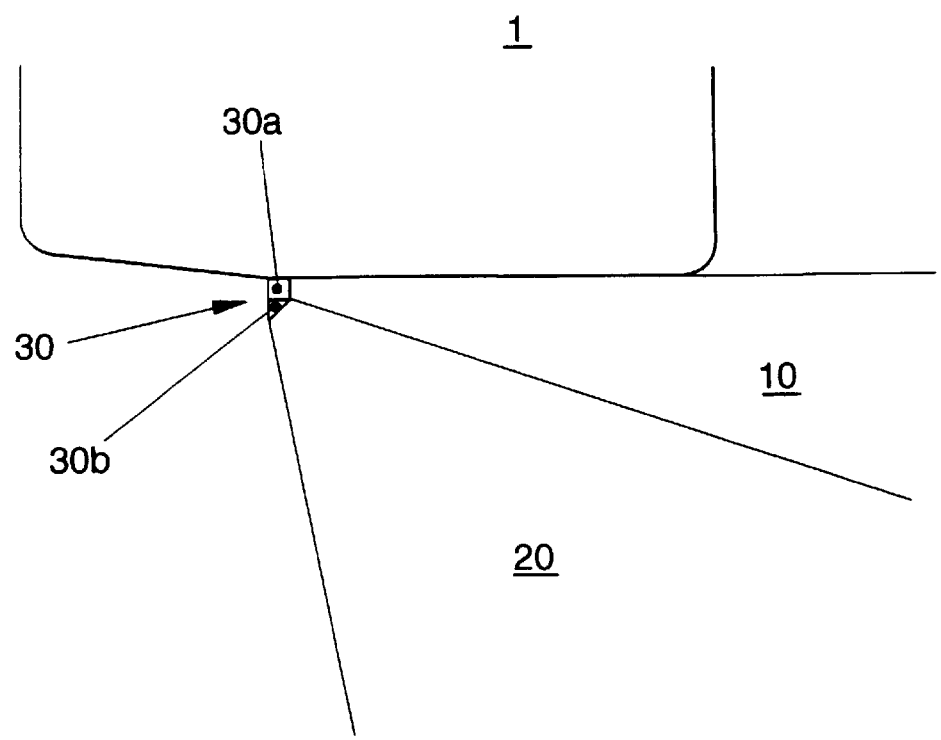
FIG. 1, is a plan view of a vehicle contour illustrating the monitored observation areas; and, FIG. 2, is a schematic representation of a display device constructed in accordance with the present invention.

FIG. 1 is a general representation of two observation zones 10 and 20, on a partial plan view of a motor vehicle 1. The angular range of observation zone 10 covers a relatively acute-angled, rearward-directed angular area, which ensures a relatively linear rearward view skirting comparatively tightly past the vehicle. In this context, one side of the angle forming observation zone 10 runs closely in a straight line past the vehicle, and the other side of the angle spreads apart from it to form an acute angle. In this manner, a straight-lined, rearward view is obtained first of all, but also partial areas, which are directed behind the vehicle, for example, toward approaching vehicles in other lanes.

The angular range of second observation zone 20, including the so-called blind spot area, has one side that conforms to the second angle side of observation zone 10. From there, the second angle side of the second observation zone 20 spreads out relatively far to the side, and thus may form an angle considerably larger than the angle covered by first observation zone 10.

Consequently, the present invention ensures a relatively gap-free viewing of second observation zone 20, the coverage extending so far that the aforesaid second angle side of the detected blind spot area can conform to the field of vision of a vehicle driver looking forward. Thus, this results in a gap-free monitoring of both the space on the side of the vehicle and the space behind the vehicle. Such an angle-wise elongation of second observation zone 20 can only be represented with difficulty, if at all, by fixed optical instruments such as mirror glasses, even in rounded form. However, this is no problem at all when using image pick-up sensor elements 30, e.g., a camera, this being a particular advantage of the present invention.

As indicated above, the invention may be implemented by a camera 30 having either a split image detection module, which in turn corresponds with two different optical systems, or else two camera elements 30a, 30b can be provided having independent image processing elements. An evaluator is necessary in both cases, to carry out the image processing and display the detected images, in the manner depicted in accordance with the present invention, on an appropriate display device 40 (FIG. 2).

An aspect of the present invention is that second observation zone 20, the so-called blind spot area, is detected over an angular range wider than first observation zone 10, which is directed rearward in a straight line, the two detected angular ranges now being additionally displayed next to each other on display device 40 in a width ratio inversely proportional to them.

Figure 2:
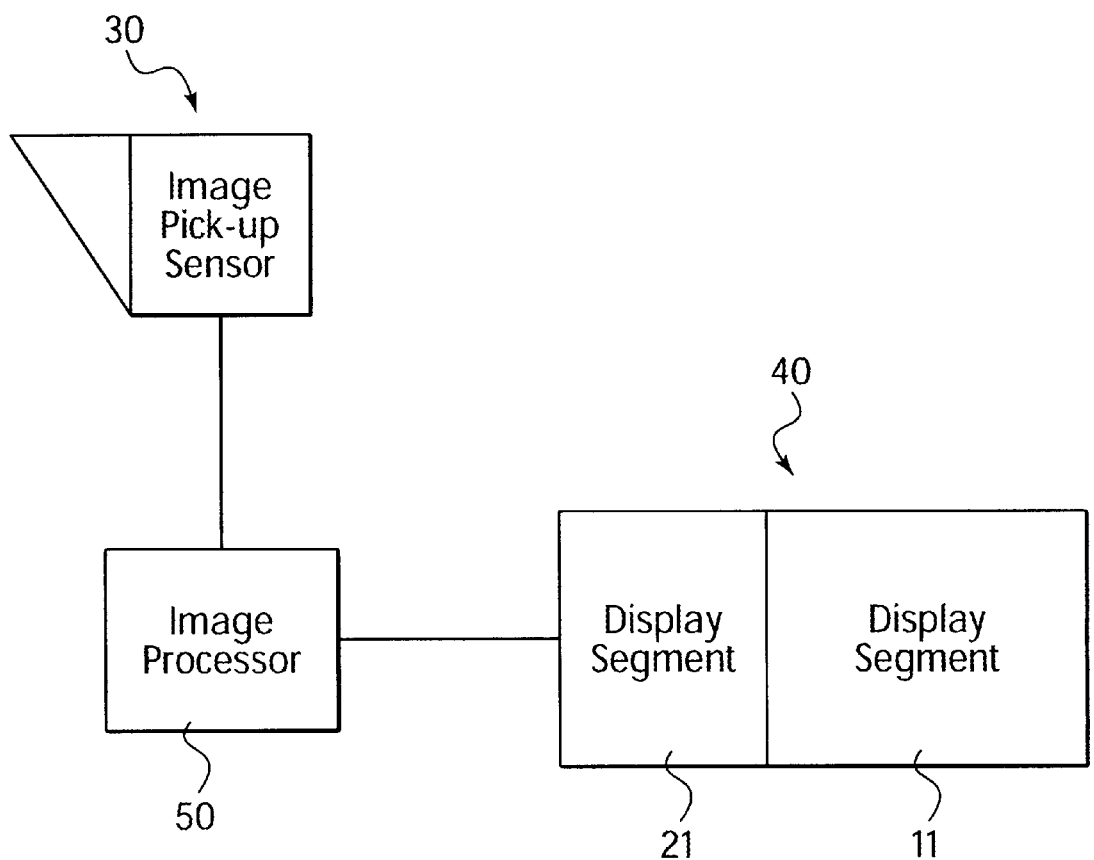

FIG. 2 depicts the representation on display device 40. First observation zone 10 shown previously in FIG. 1 and having a relatively small angular range, is displayed on a wider display segment 11, while the second observation zone 20 having a relatively large angular range is displayed on a narrower display segment 21. However, unlike in the case of fixed optical mirrors, electronic devices now make it possible to implement the invention in this form without restricting the angular range. Of course, a fixed mirror having a smaller dimension, thus smaller mirror or display surface, also allows only a small solid angle. However, this is different when using an image sensor pick-up element, e.g., a camera, especially for detecting the blind spot area. Image processor 50 can cover angular ranges nearly arbitrarily, which are then shown on the display 40, relatively independent of their actual width. Therefore, using a camera 30 is considerably more effective, especially for observing second observation zone 20, than mirror glasses, even rounded mirrors.

As discussed above, an appropriate electronic postprocessing device 50 can be connected in series to camera 30 or cameras 30a, 30b to control the corresponding display.

Through the method and device according to the invention, conventionally constructed outside mirrors having, namely, fixed mirror glasses, can be completely replaced, and furthermore, this results in the possibility of a rearward view which cannot be realized by fixed mirror glasses.

Moreover, the unique separation of observation zones 10, 20 enables the space important to the driver, next to and behind the vehicle, to be displayed without gaps during normal vehicle operation.

We claim:

1. An improved method for surveillance of an outside rearview mirror observation area of a motor vehicle, comprising:

detecting the observation area with at least one image pick-up sensor element, the observation area having an angular range;

subdividing the detected observation area into two adjacent observation zones having unequal angular ranges, the two observation zones consisting of a first observation zone and a second observation zone, the angular range of the observation area being equal to the combined angular ranges of the two observation zones, the two observation zones being coextensive with the observation area; and displaying an image of the first and second observation zones.

2. The method as recited in claim 1, wherein the displayed first observation zone is directly contiguous to a side of the vehicle and has an angular range smaller than that of the second observation zone which is contiguous to the first observation zone.

3. The method as recited in claim 1 or 2, wherein the first and second observation zones are displayed on the display device with a width ratio inversely proportional to their angular ranges.

4. The method as recited in claim 3, wherein the observation zones are detected separately from each other.

5. The method as recited in claim 3, wherein the first and second observation zones are detected jointly and further comprising the step of splitting the detected image into the first and second observation zones.

6. The method as recited in claim 1 or 2, wherein the observation zones are detected separately from each other.

7. The method as recited in claim 1 or 2, wherein the first and second observation zones are detected jointly and further comprising the step of splitting the detected image into the first and second observation zones.

8. The method as recited in claim 1 or 2, wherein the entire outside rearview mirror function is provided by the method.

9. A device for surveillance of an outside mirror rearward observation area of a motor vehicle, comprising:

at least one image pick-up sensor element for detecting the observation area, the observation area having an angular range and being subdivided into two adjacent observation zones having different angular ranges, the two observation zones consisting of a first observation zone and a second observation zone, the angular range of the observation area being equal to the combined angular ranges of the two observation zones, the two observation zones being coextensive with the observation area; and at least one display device for displaying an image of the first and second observation zones.

10. The device as recited in claim 9, wherein the first observation zone is directly contiguous to a side of the vehicle and its angular range smaller than that of the second observation zone which is contiguous to the first observation zone.

11. The device as recited in claim 9 or 10, further comprising a processing device which processes output signals of the image pick-up sensor element so that the first and second observation zones can be displayed on the display device with a width ratio inversely proportional to their respective angular ranges.

12. The device as recited in claim 11, having one image pick-up sensor element for each of the first and second observation zones.

13. The device as recited in claim 9 or 10, having one image pick-up sensor element for each of the first and second observation zones.

14. The device as recited in claim 9 or 10, wherein one image pick-up sensor element detects an image of the first and second observation zones, and the device further includes an optical device and an electronic processing device so that the detected image can be divided into separate images of the first and second observation zones when displayed.

* * * * *